Jan. 27, 1970   F. R. RACKI ET AL   3,491,920
MEASURING AND DISPENSING VALVE WITH SPRING BIASED DIAPHRAGM
Filed April 5, 1968
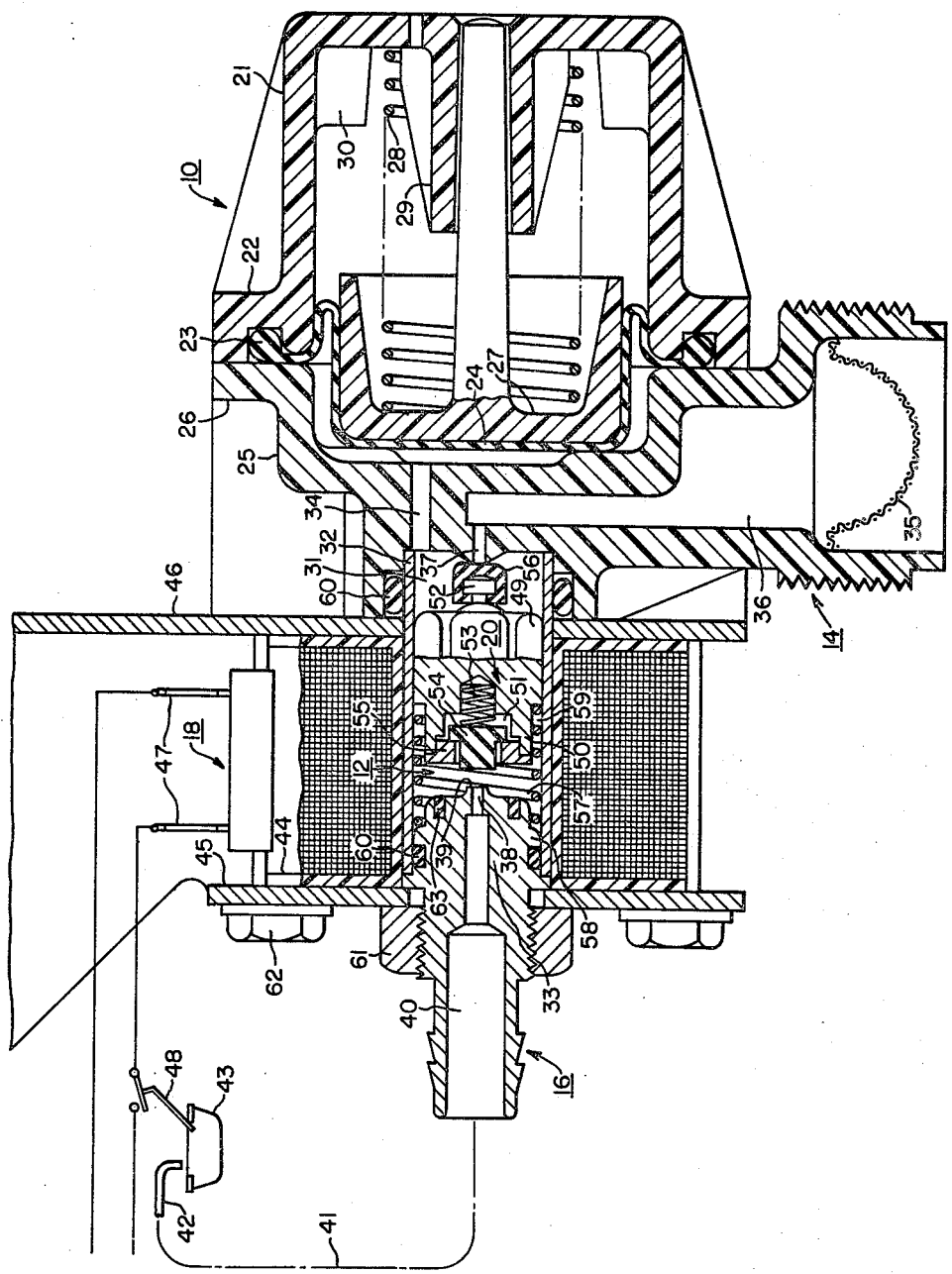
WITNESSES
Theodore F. Wrobel
James F. Young
INVENTORS
Francis R. Racki and
Frank W. Senchur
BY Edward C. Grenz
ATTORNEY

United States Patent Office 3,491,920
Patented Jan. 27, 1970

3,491,920
MEASURING AND DISPENSING VALVE WITH SPRING BIASED DIAPHRAGM
Francis R. Racki, Pittsburgh, and Frank W. Senchur, Delmont, Pa., assignors to Westinghouse Electric Corporation, Pittsburgh, Pa., a corporation of Pennsylvania
Filed Apr. 5, 1968, Ser. No. 719,036
Int. Cl. G01f *11/30, 11/36, 11/42*
U.S. Cl. 222—335                                7 Claims

ABSTRACT OF THE DISCLOSURE

Solenoid actuated valve in which the solenoid plunger carries inlet and outlet valve means on opposite ends thereof, the plunger being normally biased to a position to close the pressurized supply inlet port of the valve while the outlet port is open and in communication with the valve chamber in which the plunger is situated and the measuring chamber, the outlet valve means on the plunger including a resilient material valve plug biased in a direction to close the outlet port but yieldable in the opposite direction as the plunger moves to close the outlet end of the plunger can seat solidly against the outlet end of the valve chamber while the solenoid is energized.

BACKGROUND OF THE INVENTION

Field of the invention

The invention relates to solenoid actuated measuring and dispensing valves of the type which may be used to dispense small quantities or slugs of fluid with each actuation of the valve.

Description of the prior art

Slug valves of the type in which a measured quantity of water is received and then dispensed from the valve in accordance with actuation of a solenoid, for use in automatic ice makers, are known as evidence by such examples as U.S. Patents 3,294,290, 3,162,336 and 2,-830,743. Most valves currently used for this purpose however are used with ice makers of the character in which the liquid is dispensed to at least three ice cube pockets, and more often to an entire tray. The valve which is the subject of our invention is especially suited for use in an ice cube maker in which each pocket is individually filled. Accordingly, the valve is required to operate substantially more often for the production of a given number of ice cubes. The relatively high frequency of valve operation of course suggests the desirability of a reasonably quiet operating valve. Our valve is considered to be such a valve as well as being of a character which yields other advantages in its intended use, such as a slow discharge to avoid splashing.

SUMMARY OF THE INVENTION

In accordance with our invention, a valve chamber is provided having an inlet port at one end and an outlet port at the other end, axially aligned with each other, and with the solenoid in generally encircling relation to the valve chamber so that the solenoid plunger itself also serves as the valving member which carries the inlet valve means and outlet valve means on its opposite ends. The measuring chamber is in open communication with the valve chamber irrespective of the valve position. The solenoid plunger is biased to a position closing the inlet port, and is operable to a position closing the outlet port upon energization of the solenoid. The outlet valve means on the plunger is preferably a resilient material plug which is carried in a recess at the outlet end of the plunger and biased toward the outlet port and being yieldable in an opposite direction. Thus, when the energized solenoid moves the plunger to a position closing the outlet port, the plug contacts the outlet port first and then yields while maintaining a seal to let the end wall of the plunger seat firmly against the outlet end wall of the valve chamber. The outlet end wall of the valve chamber is of a material having magnetic properties and provided with shading means. The solid seating contact between the plunger and end wall of the chamber provides a path of relatively high permeability and yields a solenoid arrangement having a constant duty capability at low constant duty temperatures in the event the plunger becomes stuck in the energized position. This arrangement also results in a relatively low power, low cost solenoid being adequate for the service.

DRAWING DESCRIPTION

The drawing is a cross sectional view of a valve according to the invention, with a diagrammatic representation of the fluid controlled system connected to the valve.

PREFERRED EMBODIMENT

The main structural parts of the illustrated embodiment of the valve according to the invention includes a measuring chamber 10, valve chamber 12, inlet fitting 14, outlet fitting 16, solenoid coil 18 and the combined solenoid plunger and valve piece 20 in the valve chamber.

The base portion 21 of the measuring chamber 10 is a molded plastic, cup-shaped member having an outwardly flanged rim 22 provided with an annular groove therein to seat the beaded periphery 23 of the flexible rubber diaphragm 24. The head portion 25 of the measuring chamber is formed by an opposing, shallow, cup-shaped recess formed in the molded inlet fitting 14, the head portion of the measuring chamber also including an outwardly flanged rim 26 for abutting the rim 22 to clamp the bead of the diaphragm. Besides the diaphragm, the measuring chamber contains a stemmed piston 27 for supporting the underside of the diaphragm, a compression spring 28 biasing the piston in a direction (left in the drawing) to decrease the volumetric capacity of the chamber, a stem guide 29 for the piston stem, and a series of gusset-shaped stops 30 which limit the movement of the piston in the direction expanding the volumetric capacity of the measuring chamber. In the contemplated application of the valve for measuring and dispensing a quantity of water to a single pocket of an automatic ice maker, the expanded capacity of the chamber is obviously quite small, but it will be appreciated that the valve, as applied to other uses, may have a substantially greater capacity, as well as means for adjusting the limit of the piston travel to obtain different capacities.

The valve chamber 12 is defined at the measuring chamber end by a cylindrical recess 31 formed in the inlet fitting 14, along its length by the non-magnetic stainless steel sleeve 32, and at its outlet end by a portion 33 of the outlet fitting 16 which projects into the sleeve. Thus it will be appreciated that the major portion of the valve chamber lies in a space defined at its opposite ends by planes coincident with the ends of the solenoid coil 18. The valve chamber is in open communication with the measuring chamber through three passages 34 (only one shown) in the inlet fitting, the passages being triangularly arranged about the axial centerline of the valve chamber.

The inlet to the valve chamber from the pressurized house water supply source is through the inlet fitting by way of the strainer 35, the passage 36, and the small bore inlet port 37 in axial alignment with the centerline of the valve chamber. The outlet from the valve chamber is through the outlet port 38 in the raised center 39 of the outlet fitting inner end 33. The outlet port is also coaxial with the valve chamber centerline and the axis of the inlet port 37.

The outlet fitting 16 is a metallic member having magnetic properties such as 400 series stainless steel, and includes a stepped diameter bore 40 through which water exiting from the valve chamber outlet port 38 is passed to flow through a diagrammatically illustrated tube 41 for discharge out of the connected outlet 42 into an ice pocket 43.

The solenoid coil 18 is formed as a ring on a plastic spool 44, the end walls of which fit between the spaced-apart mounting bracket walls 45 and 46. The terminals 47 of the coil are connected for energization of the coil from a source of electrical power through an ice pocket actuated switch 48.

The combined solenoid plunger and valve piece 20 body portion is also of magnetic stainless steel and includes a portion 49 having a hexagonal cross section, an inwardly-offset portion 50 of circular cross section, a centered stepped diameter circular recess 51 in the plunger end facing the outlet port 38, and a headed stem 52 on the end facing the inlet port 37. The recess 51 receives, in order, a compression spring 53, a rubber plug 54 of circular cross section and having a shoulder on its inner end, and a circular retaining ring 55 which is sized to be press fit into the recess with its inner face disposed to engage the shoulder of the plug, and prevent the escape of the plug from the recess under the bias of the spring. The plug serves as the valve means for closing the outlet port 38 when it seats thereagainst upon energization of the solenoid. The headed stem 52 on the other end of the plunger carries a rubber boot 56 and closes the inlet port 37 when it seats thereagainst. The plunger is biased toward the inlet end of the chamber by a compression spring 57 having one end seating against a rim 58 on the outlet fitting, and its other end captured in the annular space 59 around the circular portion 50 of the plunger. Thus the inlet port 37 is normally closed by the boot 56 since the normal condition of the solenoid is that of being deenergized.

It will be appreciated that the hexagonal portion 49 of the plunger stabilizes the plunger in its sliding movement in the valve chamber, as well as providing a plurality of passages defined between the flat surfaces of the hexagon and the facing inside wall of the sleeve 32. Thus, the space in the valve chamber on opposite ends of the plunger are always in open communication with each other, irrespective of the plunger position, and accordingly the valve chamber is also always in open communication with the measuring chamber through the passages 34. Any non-circular shape which provides stabilization for the plunger and also passages between opposite ends of the plunger may be used rather than a hexagonal shape.

In assembling the valve to the bracket, O-rings 60 are provided at several places as indicated to insure a seal about the valve chamber. The solenoid coil 18 is inserted between the legs 45 and 46 of the bracket, with the sleeve and internal parts in place in the center of the solenoid. The outlet end fitting 16 is held in place by a jam nut 61. The inlet fitting with its O-rings 60 and the measuring chamber 10 with its internal parts are fitted in place as shown, and the bolts 62 are extended through the assembled parts to hold them together.

In assembled form, the plunger inlet valve means in the form of the boot 56 closes the inlet port 37 since the biasing spring 57 forces the plunger 20 to the right with the solenoid deenergized. When the solenoid is energized, the plunger is moved to the left to open the inlet port, and close the outlet port 38 with the outer end face of the rubber plug 54 seating on the outlet port. In this seating operation, the outer face of the plug engages the raised center 39 about the outlet port before the exposed face of the retainer ring 55 abuts the opposing face of the outlet fitting portion 33. Some damping of a dashpot character may be expected to occur with water in the valve chamber as the faces move into abutting position. The yieldable nature of the plug 54 and its biasing spring 53 permits the outer face of the retaining ring 55 to seat firmly over an extended area against the opposed face of the portion 33 of the outlet fitting having a conventional shading ring 63 so that the chance of chatter is reduced. The raised center 39 aids in insuring a good seal and compensates for manufacturing tolerances.

OPERATION

As noted, the valve is shown in the position in which the solenoid is deenergized and the biasing spring 57 holds the plunger to the right so that the inlet port 37 is closed. The diaphragm 23 is accordingly in the position illustrated in which the biasing spring 28 has decreased the volumetric capacity of the measuring chamber to its smallest limit. As an ice pocket 43 moves into position and energizes the solenoid 18 through the switch 48, the plunger will move to the left to close the outlet port 38, against the force of the biasing spring 57, and will also result in the outlet valve means 54 yielding and being pushed into the recess against the force of its biasing spring 53 so that the opposing faces of the plunger and outlet fitting may seat. The plunger is held in this leftward position so long as the solenoid is energized. As soon as the inlet port 37 is opened, water under pressure from the supply flows in through the inlet port into the valve chamber and into the measuring chamber 10 since the water is unable to flow out of the outlet port 38 which is closed. As the water under pressure fills the valve chamber it also flows through the passages 34 and pushes the diaphragm 24 and piston 27 to the right until the base of the piston is stopped by the stop members 30. The valve will stay in this condition until the solenoid is deenergized, at which time the plunger will move to the right under the force of the plunger will move to the right under the force of the bias spring 57 and the force of the bias spring 28 in the measuring chamber will push the diaphragm and piston to the left to exhaust the quantity of liquid through the now open outlet port 38 and to the ice pocket.

The arrangement is such that the solenoid plunger also serves as the carrier of the valve means, without any need of coupling a separate solenoid plunger with separate valve means. Accordingly, the valve can be relatively compact. The outlet valve means with the yielding arrangement, and the facing of the end piece and plunger faces makes for relatively quiet operation as well as lending itself to constant duty capability.

What is claimed is:
1. A measuring and dispensing valve comprising:
    a valve chamber having an inlet end and an outlet end;
    an inlet port as said inlet end of said valve chamber, said inlet port being connected to a pressurized supply of fluid;
    an outlet port at said outlet end of said valve chamber in axial alignment with said inlet port;
    a solenoid-operated plunger within said valve chamber with inlet valve means and outlet valve means on opposite ends thereof for seating against said inlet and outlet ports, respectively;
    means biasing said plunger in a direction to seat said inlet valve means against said inlet port;
    a measuring chamber;
    passage means connecting the interior of said measuring chamber with the interior of said valve chamber for providing open communication therebetween irrespective of the position of said plunger;
    a diaphragm in said measuring chamber biased in a direction of movement to exhaust fluid from said measuring chamber through said passage means, and limited in its movement in the opposite direction to limit the volumetric capacity of the measuring chamber to a predetermined quantity of fluid; and
    a solenoid coil encircling said valve chamber and operable when energized to move said plunger to seat said outlet valve means against said outlet port and open said inlet valve means from said inlet port.

2. a valve according to claim 1 wherein:
said outlet end of said valve chamber includes an extended area wall; and
the end wall of said plunger facing said extended area wall is shaped to abut a substantial portion of said extended area wall when said outlet valve means is seated.

3. A valve according to claim 1 wherein:
said plunger end carrying said outlet valve means includes a central recess therein with retainer means capturing a resilient material valve plug therein for axial movement; and
said recess contains means biasing said plug in an outlet closing direction and being yieldable in an opposite direction as said plug seats upon said outlet port.

4. A measuring and dispensing valve assembly comprising:
a ring-shaped solenoid coil having an open central bore;
a cylindrical member defining the side wall of a valve chamber located in said bore and having an inlet end and an outlet end;
an inlet fitting closing the inlet end of said valve chamber, said inlet fitting including internal passage means connected to pressurized supply of fluid and terminating in an inlet port of said valve chamber aligned with the axis of said valve chamber;
means defining a measuring chamber having a diaphragm biased in a direction to decrease the volumetric capacity of said chamber;
open passage means connecting said measuring chamber with said valve chamber;
an outlet fitting closing the outlet end of said valve chamber, said outlet fitting including a portion thereof projecting into said cylindrical member with an outlet port therein axially aligned with said inlet port at the other end of said valve chamber;
a solenoid plunger, of non-cylindrical cross section in part at least to provide passage means between opposite ends of said cylindrical member and carrying inlet valve means on one end for seating against said inlet port, and outlet valve means on the other end for alternatively seating against said outlet port, said inlet and outlet valve means being the sole valving means of said assembly so that said measuring chamber and said valve chamber are in open communication irrespective of the position of said plunger; and
means biasing said plunger to an inlet port closing position, and yieldable upon energization of said solenoid coil to permit said plunger to move to an outlet port closing position.

5. A valve assembly according to claim 4 wherein:
the major portion of said valve chamber lies in a space defined at its opposite ends by planes coincident with the ends of said solenoid coil.

6. A valve assembly according to claim 4 wherein:
said other end of said plunger includes a central recess therein carrying a resilient material plug biased toward said outlet port and yieldable in the opposite direction as said plug seats on said outlet port to permit the opposing faces of said outlet fitting and said plunger around said outlet port and plug to seat in abutting relation.

7. A valve assembly according to claim 6 wherein:
said outlet fitting portion includes a raised portion containing said outlet port to insure that said plug seats upon said outlet port before said opposing faces of said plunger and outlet fitting seat.

References Cited

UNITED STATES PATENTS 3,394,290  12/1966  Erickson et al. _____222—335
3,344,960  10/1967  Jacobs _____222—335

STANLEY H. TOLLBERG, Primary Examiner